United States Patent Office 3,132,107
Patented May 5, 1964

---

3,132,107
ISOLATION OF NEW SURFACE ACTIVE MATERIALS
Aleksander Groszek and John Rhys Lodwick, Sunbury-on-Thames, England, assignors to The British Petroleum Company Limited, London, England, a joint-stock corporation of Great Britain
No Drawing. Filed Oct. 26, 1959, Ser. No. 848,508
Claims priority, application Great Britain Nov. 7, 1958
6 Claims. (Cl. 252—351)

This invention relates to the isolation and use of new surface active materials which are present in heavy petroleum oils. A heavy petroleum oil is defined as a distillate fraction from the vacuum distillation of crude petroleum, a de-asphalted vacuum residue, or a refined or partly refined lubricating oil produced from either of these materials by one or more known lubricating oil refining treatments, e.g. solvent refining, dewaxing, clay-treating and hydro finishing.

According to the invention, the new surface active materials are isolated from the heavy petroleum oil by contacting the latter with an adsorbent for surface active materials of the oil whereby the surface active materials are extracted from the oil, separating the adsorbent from the oil, liberating the surface active materials from the adsorbent by dissolving the latter in an acid, and recovering the liberated surface active materials from the solution of acid and adsorbent.

The adsorbent, after separation from the bulk of the oil, may be washed with an organic solvent for the oil, e.g. benzene, acetone, n-heptane, chloroform, isopropyl alcohol or petroleum ether, to remove oil retained by it. The oil to be contacted with the adsorbent may be dissolved prior to the contacting step, in an organic solvent for the oil, e.g. petroleum ether.

On dissolving the adsorbent containing the surface active materials in an acid, the surface active materials are liberated from the acid solution and they may be recovered by adding an organic solvent which dissolves them but is immiscible with the acid solution, e.g. benzene, n-heptane, chloroform or petroleum ether, separating the organic solvent layer from the acid layer and recovering the surface active materials from the organic solvent by distilling off the latter. The acid and organic solvent should, of course, be chosen so that two immiscible phases are formed.

Suitable adsorbents include basic metal oxides and metal hydroxides, e.g. magnesium oxide, calcium oxide, calcium hydroxide, barium oxide and barium hydroxide. Magnesium oxide and calcium hydroxide have been found to be particularly suitable.

The amount of adsorbent used is preferably 1 to 100% by weight of the oil to be treated.

Particularly suitable acids for dissolving the adsorbent and liberating the surface active materials include acetic acid and hydrochloric acid.

According to one embodiment of the invention the oil, either alone or dissolved in an organic solvent for the oil, is mixed with the adsorbent, e.g. by stirring, which adsorbent is subsequently removed from the bulk of the oil by filtration, sedimentation and decanting, or centrifuging, and washed with an organic solvent for the oil to remove all non-adsorbed material.

According to another embodiment, the extraction of the surface active materials is carried out in a chromatographic column containing the adsorbent, the oil, either alone or dissolved in an organic solvent for the oil, being fed to the column and allowed to percolate through the adsorbent so that these materials are adsorbed by the adsorbent, and an organic solvent for the oil being subsequently passed through the column to elute material which is not strongly adsorbed by the adsorbent.

The surface active materials according to the invention are strongly adsorbed by the adsorbent and cannot be removed therefrom by solvents for the oil.

Preferably the heavy petroleum oil is one which has not been clay-treated.

The invention also consists in a method of emulsifying liquids using as an emulsifying agent a surface active material extracted from a heavy petroleum oil in the manner described above.

The invention further consists in a method of dispersing solid particles in a liquid in which they are insoluble, using as a dispersing agent a surface active material extracted from a heavy petroleum oil in the manner described above.

By way of example a number of surface active materials according to the invention were prepared as follows:

100 parts by weight of oil were mixed with 20 parts of finely powdered magnesium oxide and stirred for one hour at a temperature of 60°–70° C. The magnesium oxide was then filtered off and washed first with benzene and then with acetone until the washings were free from oil.

The dry magnesium oxide with the adsorbed surface active materials was then suspended in 100 parts by weight of water, and glacial acetic acid or concentrated hydrochloric acid added slowly until all the solid dissolved, leaving the surface active materials floating on the top of the solution.

20 ml. of petroleum ether was then added to dissolve the surface active materials and the petroleum ether solution was separated from the acid layer and evaporated leaving the surface active materials.

The above procedure was carried out using in turn the following heavy petroleum oils:

A. A blend of 55% by weight of a 620/95 grade (viscosity: 620 Redwood I seconds at 140° F.; viscosity index: 95) refined bright stock lubricating oil and 45% by weight of a 160/95 grade refined distillate lubricating oil. The bright stock oil was produced from a propane-deasphalted Middle Eastern crude oil vacuum residue and the distillate oil from the vacuum distillate of the same crude oil. In both cases the refining treatment consisted of solvent refining, solvent dewaxing and clay treating.

B. A waxy raffinate obtained in the production of a 160/95 grade lubricating oil from a Middle Eastern crude oil.

C. A waxy distillate from the vacuum distillation of a Middle Eastern crude oil. The distillate was one used for the production of a 160/95 grade lubricating oil.

Table I indicates the amount of magnesium oxide used for the treatment in each case, the acid used for dissolving the adsorbent and the amount of surface active materials isolated from each oil.

TABLE I

| Oil | Amount of MgO used, percent wt. of oil | Acid used for dissolving adsorbent | Amount of surface active material liberated, percent wt. of oil |
|---|---|---|---|
| A | 5 | Hydrochloric acid | 0.13 |
| B | 20 | ____do____ | 0.52 |
| C | 20 | Acetic acid | 0.38 |

The surface active materials isolated from oils A, B and C as described above will be referred to hereafter as surface active materials P, Q and R respectively.

The properties of the surface active materials according to the invention are illustrated by the following experiments:

Experiment 1

When the surface active materials are spread on a water surface, they form unimolecular films which exert a relatively high pressure when compressed to a small area. These high pressures are an indication of the high surface activity of the materials, and it can be concluded from the values of the pressures that the materials would be good emulsifying and dispersing agents for liquids and solids possessing polar surfaces. Table II gives the pressures of films of oil A and surface active materials P and Q. The films were applied to the water surface in solution in n-heptane which subsequently evaporated.

TABLE II

| Constituent of film | Area of film, sq. cm. | Pressure, dynes/cm. |
|---|---|---|
| A | 2,000 | 0.8 |
|   | 1,000 | 0.8 |
|   | 500 | 3.0 |
|   | 250 | 9.0 |
| P | 5,000 | 1.2 |
|   | 4,000 | 1.5 |
|   | 3,000 | 3.0 |
|   | 2,000 | 7.8 |
|   | 1,000 | 17.5 |
|   | 500 | 25.0 |
| Q | 5,000 | 2.2 |
|   | 4,000 | 5.2 |
|   | 3,000 | 9.0 |
|   | 2,000 | 12.5 |
|   | 1,000 | 15.5 |
|   | 250 | 17.2 |

Experiment 2

The heat evolved when n-heptane is replaced from the surface of activated carbon by a surface active material may be taken as a measure of the tendency of such a material to form adsorbed films on carbon and, consequently, as a measure of the capacity of the material to disperse carbon in non-polar liquids.

The values determined for surface active materials P and Q are given in Table III together with the heat effects produced by two commercial detergent additives.

TABLE III

| Surface Active Material | Heat of replacement of n-heptane by 0.01 ml. of surface active material, calories/g. carbon |
|---|---|
| P | 0.03 |
| Q | 0.18 |
| Detergent Additive X | 0.02 |
| Detergent Additive Y | 0.01 |

These figures indicate that both materials P and Q are better dispersants than the commercial additives X and Y, material Q being outstandingly good.

Experiment 3

The ability of surface active materials P and Q to suspend finely divided carbon (average particle size 8.8 microns) in a non-polar liquid, n-heptane, is shown by the sedimentation data given in Table IV. Data are also given for commercial detergent additives X and Y. In each case 0.1 g. of finely divided carbon was suspended in 10 ml. of pure n-heptane in a test tube of 1 cm. internal diameter. The mixture was shaken by hand ten times and the test tube left standing in a test tube rack. The suspension of carbon gradually settled leaving a layer of clear liquid at the top. The amount of materials P, Q, X and Y used in each case was 0.05 g.

TABLE V

| Time, Minutes | Height of sedimented carbon, mm. | | | | |
|---|---|---|---|---|---|
|  | No Additive | P | Q | X | Y |
| 0 | 85 | 85 | 85 | 85 | 85 |
| 5 | 19 | 81 | 82 | 83 | 80 |
| 10 | 15 | 77 | 80 | 78 | 77 |
| 15 | 14 | 73 | 77 | 74 | 71 |
| 20 | 12 | 69 | 75 | 71 | 66 |

Experiment 4

A dispersion of sodium nitrite in a 150/75 grade lubricating oil was made as follows using surface active material Q as a dispersing agent.

Active material Q (1.7 g.) was dissolved in 100 g. of a 150/75 grade lubricating oil. To this solution was added, slowly and with gentle stirring, 15 g. of sodium nitrite dissolved in 30 g. of water. The resultant mixture was then stirred rapidly to give an emulsion. When this emulsion was heated above 100° C., with stirring to drive off the water, an anhydrous dispersion of sodium nitrite in the oil was obtained. The maximum particle size in this dispersion was 5 microns. The stability of the dispersion was very good.

Experiment 5

Active material P was converted into an improved dispersant for carbon by reacting it with a solution of barium hydroxide. The conversion was carried out as follows:

45 grams of the surface active material were dissolved in 135 grams of a mineral oil (160/95 grade) and heated to 95° C. with stirring. A hot solution of 11 grams of barium hydroxide in about 20 ml. of water was added to the hot mixture with rapid stirring. The temperature of the mixture was maintained at about 100° C. and the heating and stirring continued until all the water was evaporated. The mixture was then cooled to room temperature and left to stand overnight. Subsequently the clear oil was decanted from the mixture. The barium content of the decanted oil was found to be 2.8% by weight by emission spectroscopy. The material thus obtained was subjected to the carbon suspension test as described in Experiment 3. No settling of carbon occurred after 40 minutes which was a considerable improvement over suspending ability of material P as given in Table IV. In the carbon suspension test allowance was made for the dilution of material P with mineral oil prior to reaction with barium hydroxide, so as to have the same amount of additive in n-heptane solution as those reported in Table IV.

We claim:

1. A process for isolating surface active materials from a heavy petroleum oil, comprising contacting a heavy petroleum oil with a basic acid-soluble adsorbent for the surface active materials contained in said oil, whereby the surface active materials are extracted from said oil, said adsorbent being selected from the group consisting of magnesium oxide, calcium oxide, barium oxide, calcium hydroxide and barium hydroxide; contacting the unextracted heavy petroleum oil with an organic solvent selected from the group consisting of n-heptane, petroleum ether, benzene, acetone, chloroform and isopropyl alcohol to separate said unextracted heavy petroleum oil from the absorbent with its contents of adsorbed surface active materials, dissolving said adsorbent in an acid selected from the group consisting of hydrochloric and acetic acids to liberate the surface active materials from said adsorbent, recovering the surface active materials from the solution of acid and adsorbent by dissolving said liberated surface active materials in an organic solvent selected from the group consisting of n-heptane, petroleum ether, benzene and chloroform.

2. The surface active material obtained by the process set forth in claim 1.

3. The process as recited in claim 1 wherein said adsorbent is magnesium oxide.

4. The process as recited in claim 1 wherein said adsorbent is calcium hydroxide.

5. The process as recited in claim 1 wherein said acid is hydrochloric acid.

6. The process as recited in claim 1 wherein said acid is acetic acid.

References Cited in the file of this patent

UNITED STATES PATENTS

| | | |
|---|---|---|
| 2,470,339 | Claussen et al. | May 17, 1949 |
| 2,905,704 | Hirschler | Sept. 22, 1959 |
| 2,941,018 | Foreman | June 14, 1960 |

OTHER REFERENCES

Schwartz et al.: "Surface Active Agents," Interscience Pub. Inc (1949), pages 6, 17 and 19.

UNITED STATES PATENT OFFICE
CERTIFICATE OF CORRECTION

Patent No. 3,132,107 May 5, 1964

Aleksander Groszek et al.

It is hereby certified that error appears in the above numbered patent requiring correction and that the said Letters Patent should read as corrected below.

Column 3, TABLE III, in the heading to the second column, for "claories" read -- calories --; column 4, line 3, for "TABLE V" read -- TABLE IV --.

Signed and sealed this 22nd day of September 1964.

(SEAL)
Attest:

ERNEST W. SWIDER
Attesting Officer

EDWARD J. BRENNER
Commissioner of Patents